United States Patent [19]

Chen

[11] Patent Number: 4,995,296

[45] Date of Patent: Feb. 26, 1991

[54] LARGE TIRE BOLT FIXING TOOL

[76] Inventor: Sheng N. Chen, 3th Floor, No. 8, Alley 1, Lane 32, YiShin 2nd Rd., Kaohsiung, Taiwan

[21] Appl. No.: 469,016

[22] Filed: Jan. 23, 1990

[51] Int. Cl.⁵ .................................... B25B 21/00
[52] U.S. Cl. ............................ 81/57.44; 173/163; 173/164
[58] Field of Search ............... 173/109, 163, 145, 164; 408/702, 124; 81/57.44

[56] References Cited

U.S. PATENT DOCUMENTS 2,263,736  11/1941  Lear ................................. 81/57.44
3,802,517   4/1974  Cooke-Yarborough ............ 173/18
4,748,873   6/1988  Snyder ............................. 81/57.39

FOREIGN PATENT DOCUMENTS 116427  6/1961  U.S.S.R. ............................ 173/163

Primary Examiner—Hien H. Phan
Assistant Examiner—John M. Husar
Attorney, Agent, or Firm—Fleit, Jacobson, Cohn, Price, Holman & Stern

[57] ABSTRACT

A large tire bolt fixing tool used for screwing on or off tire bolts in a large automobile, utilizing the air compressing system of the automobile in operating this tool.

2 Claims, 3 Drawing Sheets

4,995,296

LARGE TIRE BOLT FIXING TOOL

BACKGROUND OF THE INVENTION

Usually large tire bolts used in large automobiles are screwed on or off by tools connected with an air compressor and almost impossible to be screwed off with a hand tool after screwed tightly on. So whenever a tire has a puncture on a road, workers and a service car have to be called to the site for repair. Besides, if the site is very far from a town or a city, it is quite inconvenient and takes a lot of time to get a service car.

SUMMARY OF THE INVENTION

The object of this invention is to provide a large tire bolt fixing tool which can screw it off or on by a driver himself, making use of the air compressing system of the large automobile without the need of calling a service station for a service car.

This large tire bolt fixing tool in the present invention comprises a compress cylinder, a position tube, an orientation tube, a rotating shaft and a bolt fitter as the main parts.

The compress cylinder has a tubular shaft to be moved forward by the compressed air coming from the air compressing system of an automobile. The tubular shaft contains a spring to push a rotating shaft which is contained in the position tube. The compress cylinder is combined with the position tube, which contains a spring to push the orientation tube back to its normal position. The front end of the position tube is combined with the bolt fitter having two holes, one for fitting a cap for a bolt to be screwed on or off to fit in and the other for another bolt adjacent to the one fitted in the cap to stabilize this tool in action.

The orientation tube contained in the position tube has its inner hollow mortised in by the rotation shaft which can be rotated and be moved forward by means of mutual engagement of helical projections of the orientation tube and a helical groove of the rotation tube.

In using this tool after wholly assembled together, first fit the cap to a bolt, push a button on the compress cylinder to let the compressed air flow therein. Then the tubular shaft in the cylinder is pushed forward, and thereby the orientation tube can be also pushed forward by the tubular shaft so that the rotating shaft can be rotated to move forward simultaneously to rotate the cap fitted in the bolt fitter. Therefore, the bolt of the tire fitted in the cap can be rotated.

BRIEF DESCRIPTION OF THE DRAWINGS

This invention will now be described in detail with reference to accompanying drawings wherein.

DETAILED DESCRIPTION OF THE INVENTION

Figure 1:
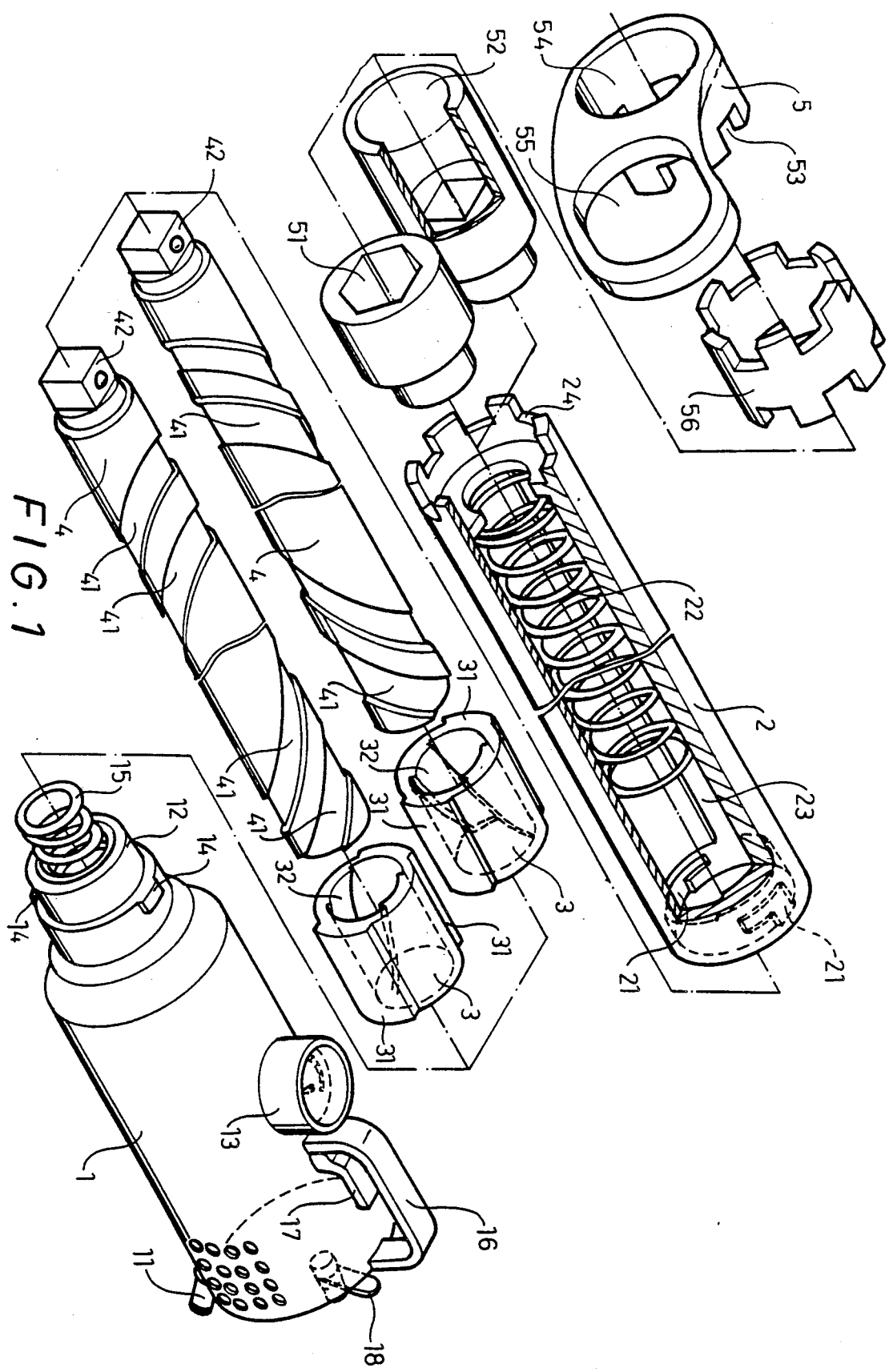
FIG. 1 is an exploded perspective view of the large tire bolt fixing tool in accordance with the present invention.

At first, as FIG. 1 shows, the tire bolt fixing tool in the present invention comprises compress cylinder 1, position tube 2, orientation tube 3, rotating shaft 4 and bolt fitter 5 as the main parts.

Compress cylinder 1 is to be connected with the air compressing system of an automobile, provided with inlet valve 11 to receive the compressed air from the car, tubular shaft 12 to be advanced forward by the compressed air, pressure gauge 13 to read the pressure for tightness of a bolt being screwed on, projection 14 to connect with position tube 2, spring 15 to be contained in tubular shaft 12 to urge rotating shaft 4 in order to confine rotating shaft 4 within position tube 2, handle 16 for gripping said cylinder 1 and switch 17 under handle 16 to let in the compressed air, which can be let out by switch 18.

Position tube 2 is provided with L-shaped groove to unite said tube 2 with compress cylinder 1, spring 22 inserted in the interior to resiliently push orientation tube 3 back to its normal position, two opposite straight grooves 23 on the inner surface for two projecting sections 31 of orientation tube 3 to stick in for limiting orientation tube 3 to move straight only but not to rotate, and teeth at one end to engage with bolt fitter 5.

Orientation tube 3 can be right-handed or left-handed according to the screw direction of a bolt and so can be rotating tube 4. Orientation tube 3 is to be set inside position tube 2, provided with two opposite projecting sections 31 engaging with two opposite straight grooves 23 so that said tube 3 cannot rotate but move straight, and two helical projecting sections 32 on the inner peripheral surface to engage with helical groove 41 in the peripheral surface of rotating shaft 4 so that the inner hollow of orientation tube 3 can be fitted in by rotating shaft 4.

Rotating shaft 4 fitted in the inner hollow of orientation tube 3 is provided with wide helical groove 41 for projecting sections 32 to engage with, and square end 42 to engage with cap 51 or 52 for a bolt on the wheel to fit in.

Bolt fitter 5 is provided with teeth 53 to engage with teeth 24 of position tube 2, round hole 54 for cap 51 or 52 for a bolt to be screwed off to fit and rotate therein, round hole 55 beside round hole 54 for an adjacent bolt on the wheel to fit in so that this tool can be stabilized in great degree in handling it.

Figure 2:
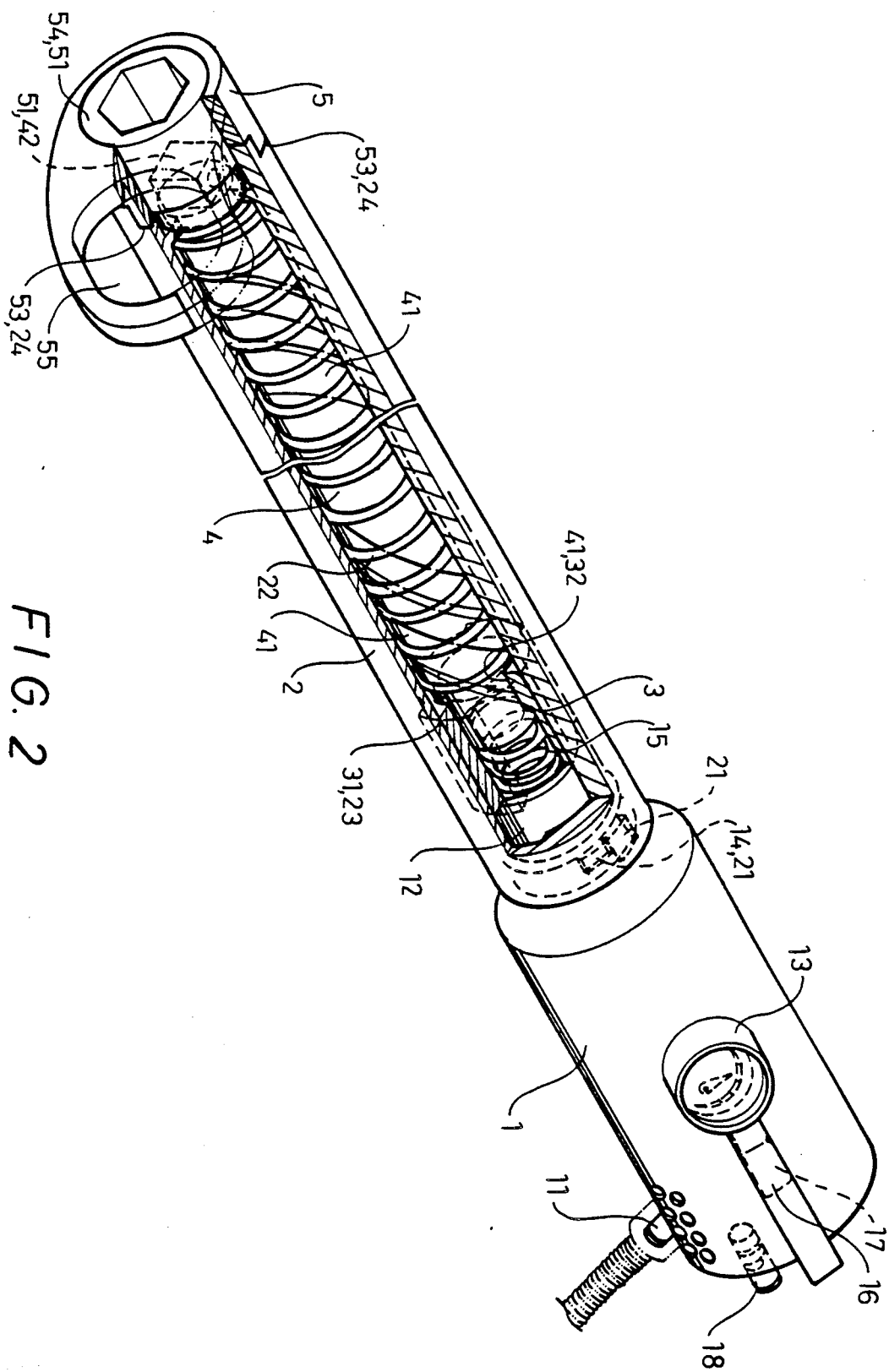
FIG. 2 is a perspective and a partly cross-sectional view of the first embodiment of the present invention.

Next, referring to FIG. 2, when this tool wholly assembled is connected with the air compressing system, compress cylinder 1 is activated by the compressed air such that tubular shaft 12 is extended outward pushing orientation tube 3 and thereby rotating shaft 4 is rotated by engagement of helical groove 41 with helical projecting sections 32. Therefore, the bolt on the wheel fitted in cap 51 can be rotated by cap 51 rotating with said shaft 4 at the same time.

Figure 3:
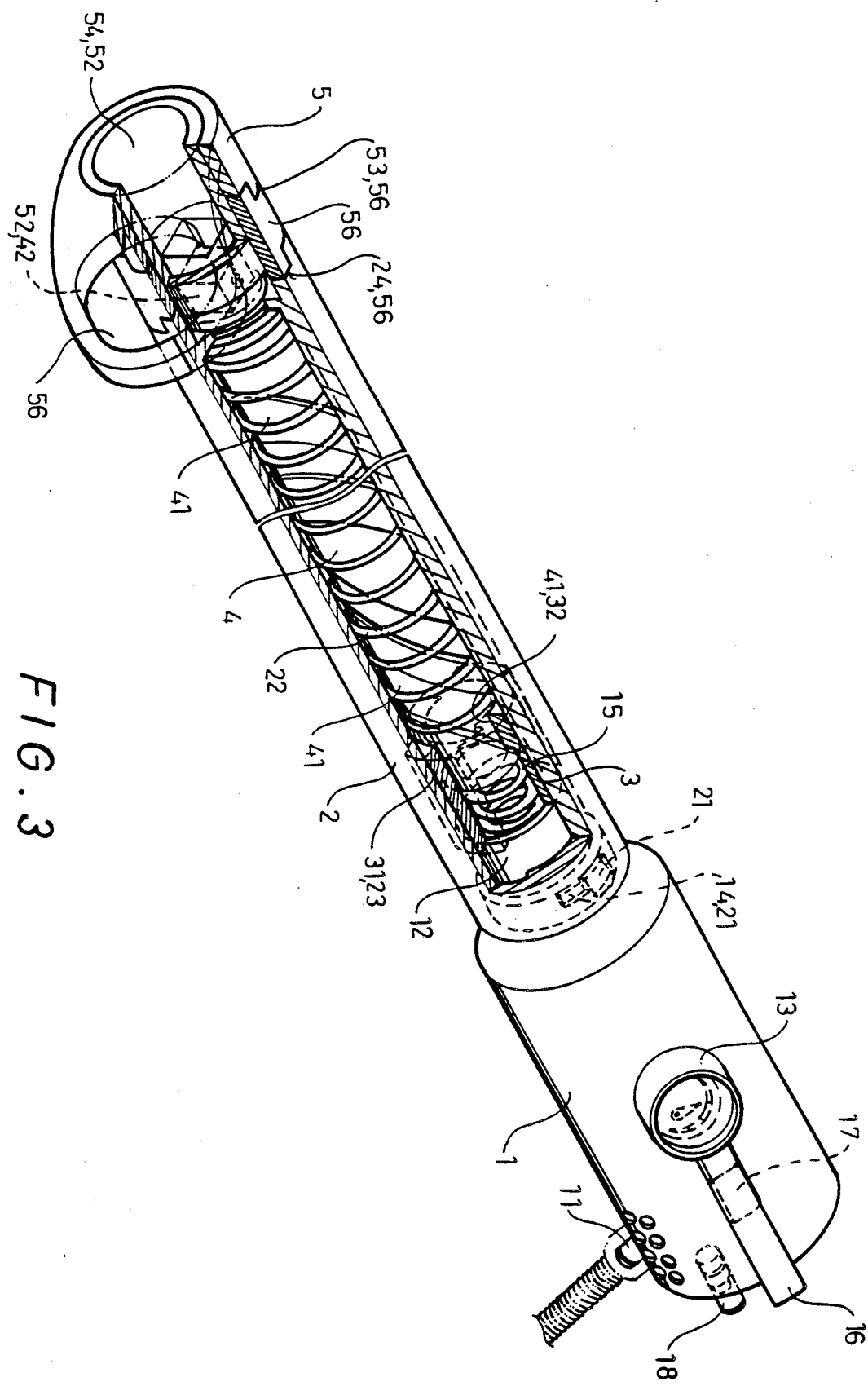
FIG. 3 is a perspective and a partly cross-sectional view of the second embodiment of the present invention.

Besides, as FIG. 3 shows, extending socket 56 can be added between position tube 2 and bolt fitter 5 for combining cap 52 longer than cap 51 to link with rotating shaft 4 in order to cope with bolts in the inside or in the outside of the wheel.

Generally speaking, in screwing a bolt tightly on or loosening it off, it takes much force at the end or the beginning of the action. And common large automobiles can produce compressed air of about 8.5 kg/cm, which is enough to operate this tool in fixing bolts on and off, as long as the engine is kept on working. Besides, this tool has a torque of 150 kg/cm.

What is claimed is:

1. A wheel bolt rotating tool comprising:

a compressed air cylinder having an inlet valve for leading in compressed air, a tubular shaft extensible outward from the cylinder by the action of compressed air, a spring contained in the tubular shaft to push a rotating shaft, a first element of a bayonet fitting to releasably attach the cylinder with a position tube and a handle for gripping the cylinder;

a position tube having a second element of the bayonet fitting at one end to combine releasably with the first element on the cylinder, teeth at the other end to engage releasably with a bolt fitter, a helical spring contained in the interior of the position tube which also contains an orientation tube and a rotating shaft, the spring and orientation tube being arranged end to end around the shaft, at least one linear groove in the inner surface of the position tube for receiving a projecting section on the outer surface of the orientation tube;

the orientation tube further provided with at least one helical projection in the inner surface to engage with a helical groove in the rotating shaft;

the rotating shaft having an outer end fitting in a removable bolt-engageable cap;

a bolt fitting having teeth to engage releasably with the teeth on the position tube, and a round hole for receiving said cap to fit and rotate therein; and the tubular shaft in the cylinder capable of being pushed forward by compressed air coming through the inlet valve so that the rotating shaft can be rotated by forward movement of the orientation tube and the cap fitted at the front end of the rotating shaft can be rotated to rotate a bolt fitted in the cap.

2. The tool as claimed in claim 1, wherein the bolt fitting is provided with an oval hole adjacent the bolt hole for an adjacent bolt on a wheel to fit in for stabilizing the tool in action.

* * * * *